United States Patent [19]
Gallup et al.

[11] Patent Number: 5,145,515
[45] Date of Patent: Sep. 8, 1992

[54] TREATMENT OF BRINE

[75] Inventors: Darrell L. Gallup, Chino; John L. Featherstone; Jessie P. Reverente, both of El Centro; Philip H. Messer, Palm Desert; Allen W. Doty, Pomona, all of Calif.

[73] Assignee: Union Oil Company of California, Los Angeles, Calif.

[21] Appl. No.: 458,886

[22] Filed: Dec. 29, 1989

Related U.S. Application Data

[63] Continuation-in-part of Ser. No. 345,167, May 1, 1989, Pat. No. 5,082,492.

[51] Int. Cl.$^5$ .............................. C22B 3/44
[52] U.S. Cl. ..................... 75/712; 75/726; 75/732; 75/736; 75/733; 166/267; 210/719; 423/DIG. 19
[58] Field of Search ............... 75/712, 726, 732, 733, 75/736; 166/267; 210/719; 423/DIG. 19

[56] References Cited

U.S. PATENT DOCUMENTS

3,744,995  7/1973  MacKay .......................... 75/733
4,602,820  7/1986  Hard ............................... 75/712
4,756,888  7/1988  Gallup et al. .................. 75/712

*Primary Examiner*—Melvyn J. Andrews
*Attorney, Agent, or Firm*—Gregory F. Wirzbicki; Clark E. DeLarvin

[57] ABSTRACT

A method is disclosed for polishing geothermal brines containing iron-rich silica scale and silica particles suspended therein while removing and recovering copper, silver and other precious metals dissolved therein. The method comprises passing brine having a pH just below about 5.0 through a conduit packed with a metal higher in the electromotive series than silver for a time sufficient for a substantial portion of the copper and silver therein to precipitate onto the packing. Preferably, the packing comprises coiled zinc-galvanized steel chicken wire mesh packed in a sufficient density to act as a filter for said suspended particles. Dissolving the packing in a suitable acid will leave a precious metal-rich residue behind for subsequent recovery. When the brine is treated in accordance with this method, the useful life of injection wells used to return cooled brine back to the geothermal field is extended by at least about 3 time as compared to that observed with untreated brine. Further the treated brine is less corrosive than it was before treatment.

92 Claims, 1 Drawing Sheet

TREATMENT OF BRINE

REFERENCE TO RELATED APPLICATIONS

This application is a continuation-in-part of Co-pending U.S. Ser. No. 07-345,167, filed May 1, 1989 now U.S. Pat. No. 5,082,492.

BACKGROUND OF THE INVENTION

1. Field of the Invention

This invention relates to the treatment of a hot aqueous brine solution containing various dissolved components, such as iron, silver and silica, to inhibit precipitation of undesirable scale, such as iron silicate scale, while enhancing deposition and recovery of a valuable silver-containing scale. More particularly, the invention relates to such a treatment wherein the scale is formed in a geothermal brine which is being processed to recover its heat content and the brine is handled prior to injecting it back into a geothermal reservoir. The invention also relates to a method for reducing the corrosivity of such brine.

2. Description of Prior Art

The solubility of most ions in solution decreases with a decrease in temperature or pressure of the solution. If dissolved ions are present near their saturation concentration in the solution, a slight reduction in the temperature or pressure of the system can result in precipitation of a portion of these ions, which often combine and deposit as a scale on any solid surface with which they come into contact, such as the vessel or conduit in which the solution is confined.

One example of such a solution is a liquid stream containing hot water which is passed through a conduit in an industrial operation under conditions, such as a lowering of the pressure, which flash at least a portion of the hot water to steam. If the hot water is a brine containing appreciable amounts of dissolved salts, this flashing is often accompanied by the formation of scale on the surfaces of the conduit contacted by the fluid stream. Scale deposits tend to build up over a period of time and restrict further fluid flow through the conduit requiring either operation at a reduced flow rate or an increase in the amount of power used to move the fluid through the conduit. In extreme cases, the conduit can become completely plugged with scale and the industrial operation must be shut down for maintenance. Industrial operations for generating steam power often are hampered by the buildup of scale deposits caused by flashing of hot water containing dissolved salts.

Geothermal steam and hot brines are found in naturally occurring, large subterranean reservoirs in many regions of the world. When hot geothermal fluids can be used to generate electric power, pressurized geothermal water or brine, having a temperature above about 400° F., is flashed to a lower pressure and the steam generated thereby drives a steam turbine in combination with an electric generator. However, formidable problems are generally encountered in handling and disposing of large amounts of heavily contaminated and frequently highly saline geothermal liquids. Consequently, production of electricity from geothermal waters on a commercial scale has been difficult and costly to achieve.

One of the most serious problems encountered in using hot geothermal liquids for producing electric power results from scaling of the equipment used to confine and contain the liquid. Because geothermal liquids have usually been confined in subterranean reservoirs for extraordinarily long periods of time at elevated temperatures, large amounts of minerals are leached from the reservoirs into the brine. Typically, salts and oxides of heavy metals, such as lead, zinc, iron, silver, cadmium and molybdenum, are found in geothermal brine. Other more common minerals, such as calcium and sodium, are also dissolved in the brine, as are naturally occurring gases, including carbon dioxide, hydrogen sulfide and methane. An especially troublesome component of the hot brine may be silica, which is found in large concentrations in the form of silicic acid oligomers. These tend to precipitate out at almost every stage of brine processing, either as substantially pure silica or as a tightly adherent iron-silica scale. If this scale is not removed, or prevented from forming, serious problems can arise with conduit plugging. Even when the brine has completed its passage through the plant, it typically retains some small amount of silica, which if not removed, will eventually result in the plugging of the injection wells used to return the now cooled brine to the geothermal field.

Various proposals have been made to decrease the scale formation in equipment used in producing and handling geothermal brine. In "Field Evaluation of Scale Control Methods: Acidification," by J. Z. Grens et al, Lawrence Livermore Laboratory, Geothermal Resources Council, Transactions, Vol. 1, May, 1977, there is described an investigation of the scaling of turbine components wherein a geothermal brine at a pressure of 220 to 320 p.s.i.g. and a temperature of 200° to 230° C. (392° to 446° F.) was expanded through nozzles and impinged against static wearblades to a pressure of 1 atmosphere and a temperature of 102 C. (215. F.). In the nozzles, the primary scale was heavy metal sulfides, such as lead sulfide, copper-iron sulfide, zinc sulfide and cuprous sulfide. Thin basal layers of fine-grained, iron-rich amorphous silica promote adherence of the primary scale to the metal substrate. By contrast, the scale formed on the wearblades was cuprous sulfide, native silver and lead sulfide in an iron-rich amorphous silica matrix. When the brine which originally had a pH of 5.4 to 5.8 was acidified with sufficient hydrochloric acid to reduce the pH of the expanded brine to values between 1.5 to 5.0, scaling was eliminated. However, such acidification of hot brines increases the corrosion of the brine-handling equipment to such levels that it often defeats the purpose of using acid for scale control.

It is known to recover metal values and salts from brine, such as geothermal brine produced from a subterranean reservoir. U. S. Pat. No. 4,127,989 to Michelson discloses a method in which brine is pressurized and maintained above the bubble point pressure and thereafter a precipitating agent, such as a soluble sulfide, is added to the brine to enhance formation of insoluble metal sulfide precipitates. Soluble salts and metal values are recovered from the brine effluent after the hot brine has been processed to recover energy therefrom. Silver sulfides are among the mineral values recovered by this process.

While the aforementioned treatments have met with some success in particular applications, the need exists for a further improved treating process to better control the scaling process and to efficiently recover the mineral values in geothermal brines containing silver and/or other precious metals.

Accordingly, it is the object of this invention to provide an improved method for recovering valuable precious metal-containing scales from clarified geothermal brines, inhibiting the overall precipitation of scale, particularly iron-silicate scale, inhibiting corrosion, and polishing the fluid so as to prevent the transport of residual silica and other particulate material suspended therein to an injection well.

Other objects, advantages and features of the invention will be apparent from the following description, drawings and appended claims.

SUMMARY OF THE INVENTION

The present invention provides a method for inhibiting the deposition of iron silicate and other scales from an aqueous fluid, such as a geothermal brine and polishing said fluid to stabilize suspended silica and/or other dissolved components therein, while promoting the recovery of silver and other precious metals in the brine. The invention further provides a method for reducing the corrosivity of the brine.

In the present invention, a stream of a pressurized hot water or brine solution, particularly a geothermal brine, containing precious metals such as silver, gold and platinum, trivalent metal ions, especially those of iron and manganese, together with silica species dissolved or suspended therein, is first acidified with a water-soluble acid, which is added thereto in an amount sufficient to lower the pH of the aqueous solution, typically between about 0.1 and about 0.5 pH units, so that the pH of the overall solution is below, preferably just below, about 5.0, and then passed through a conduit packed with one or more metals higher in the electromotive series than silver and preferably, higher than copper. At this pH, the overall formation of scale in the system, especially iron silicate scale, is inhibited, while corrosion is minimized, with a substantial proportion of the precious metals in the brine precipitating out. Typically the brine will be at a temperature of from about 50° F. to 400° F. The brine is preferably treated just prior to being deep-well injected into the earth for disposal. The packing metal is preferably in a form adapted to act as a filter for any particles of scale suspended in the brine at the time of treatment. When this is done, both corrosion and scale deposition in the piping and bore hole of the injection well are substantially reduced. The precious metals deposited on the packing may be recovered by a variety of methods. Where coiled steel wire is used as the packing medium, a precious metals-rich scale may be recovered simply by dissolving the steel wire substrate in hydrochloric acid.

BRIEF DESCRIPTION OF THE DRAWING

The present invention will be more readily understood by reference to the drawing which depicts, in diagram form, relevant portions of an exemplary geothermal brine production well and power plant with which the method of the present invention may be used to advantage.

DETAILED DESCRIPTION OF THE INVENTION

In producing and utilizing hot pressurized brine solutions, which contain dissolved metal salts at or near their saturation concentration, a reduction in pressure and/or temperature of the solutions causes a portion of the metal salts to precipitate and deposit as scale on the surfaces of the vessel or conduit confining the brine. Examples of such hot pressurized brine solutions include geothermal brines and other brines used in a wide variety of industrial operations. A number of different types of scale can form depending on the nature and concentration of the metal salts in solution. Many of these scales are soluble in an acid solution. However, the addition of acid into the system usually results in severe corrosion of the ferrous metals normally used in the manufacture of the confining vessels and conduits, particularly when the brine is at a high temperature, for example, between 250° and 500° F. While corrosion inhibitors are known for most acids, these inhibitors do not function well under the severe temperature conditions of many systems. Thus, the use of acid to dissolve such scale has been limited and most often is confined to systems employing expansive corrosion resistant metals.

The concentration of ferric and trivalent manganese ions, and silica species contributed by iron, manganese and silica containing minerals dissolved from the reservoir by the hot brine, is normally high so that the silicates of these metals are among the most pervasive and troublesome scales formed in the equipment used to handle and process geothermal brines. In particular, it is important that these and other heavy metal scale forming entities be removed or otherwise stabilized so that, when the brine is to be injected back into the geothermal pool, scaling will not occur in the injection well. A failure to do so often results in these entities being deposited in the well bore and greatly increasing the resistance to flow therein. However, the corrosion of ferrous metals caused by an excessive addition of acid to the system further increases the concentration of ferric ions potentially available to form these scales. Therefore, any acid addition must be carefully monitored and controlled.

It has now been found that scale formation from brine can be reduced, precious metals recovery enhanced, and silica and scale previously formed and still suspended in the brine can be removed, prior to deep-well injection of the brine by adding thereto a brine-soluble acid in an amount sufficient to lower the pH of the brine to below, preferably just below about 5.0, (i.e., to about 4.9), just prior to passing the brine through a conduit packed with one or more metals higher in the electromotive series than silver, and preferably higher than copper. Typically, the processed brine has a pH such that the required pH reduction is between about 0.1 and about 0.5 pH units. Generally, about 20 to about 180 weight parts per million of a water-soluble acid are required. Higher concentrations of the acid can interfere with the activity of certain of the reducing agents listed hereinafter. While any acid used may be employed in concentrated form, it is common to employ aqueous solutions of such acids. For example, an aqueous solution containing about 31 percent by weight hydrochloric acid is often used. Of course, when the brine solution already has a pH of about 4.9, further acid addition may be omitted.

Acids suitable for use in this invention are inorganic mineral acids, organic carboxylic acids, mixtures thereof, and combinations of inorganic and organic acids. Mineral acids which may be used are hydrochloric, sulfuric, nitric and perchloric acid. Suitable organic carboxylic acids are those that form water-soluble or acid-soluble salts of alkali metals and alkaline earth metals. Aromatic and aliphatic monocarboxylic, dicarboxylic and tricarboxylic acids having about 1 to 6 carbon atoms can also be used. The carboxylic acids can be saturated or unsaturated and substituted or unsubstituted. When a substituted carboxylic acid is used, the most common substituent is the chloride ion. For example, benzoic, formic, acetic, chloroacetic, peracetic, trichloroacetic, citric, oxalic and maleic acids can be used. The most preferred acid is hydrochloric acid.

Normally one would expect that the acid treated brine solution would have a substantially greater corrosive effect on downstream ferrous metal components than it would have had without acid treatment. Surprisingly, just the opposite occurs. Brine treated in accordance with the present invention is actually less corrosive (in spite of the acid addition) than it is before treatment. It is believed that the decreased corrosion rates on the downstream metal conduits and components is related to the removal of ferric iron from the brine as it passes through the metal packing. However, other reactions may be taking place in the metal packing to reduce the corrosivity of the brine; therefore, the invention is not to be bound by any particular theory of operation.

To further minimize the corrosion of the metal components, a reducing agent may be added, usually in an amount slightly greater than that stoichiometrically required to reduce any trivalent iron and trivalent manganese cations contained in the fluid stream to divalent cations. As described in Assignee's U.S. Pat. No. 4,765,888, dated Jul. 12, 1988, the teachings of which are incorporated in their entirety herein by reference, the reducing agent also aids in the reduction of scale by reducing the number of trivalent iron and manganese cations present in the brine that contribute to the corrosion of the containing vessels and conduits.

Figure 1:
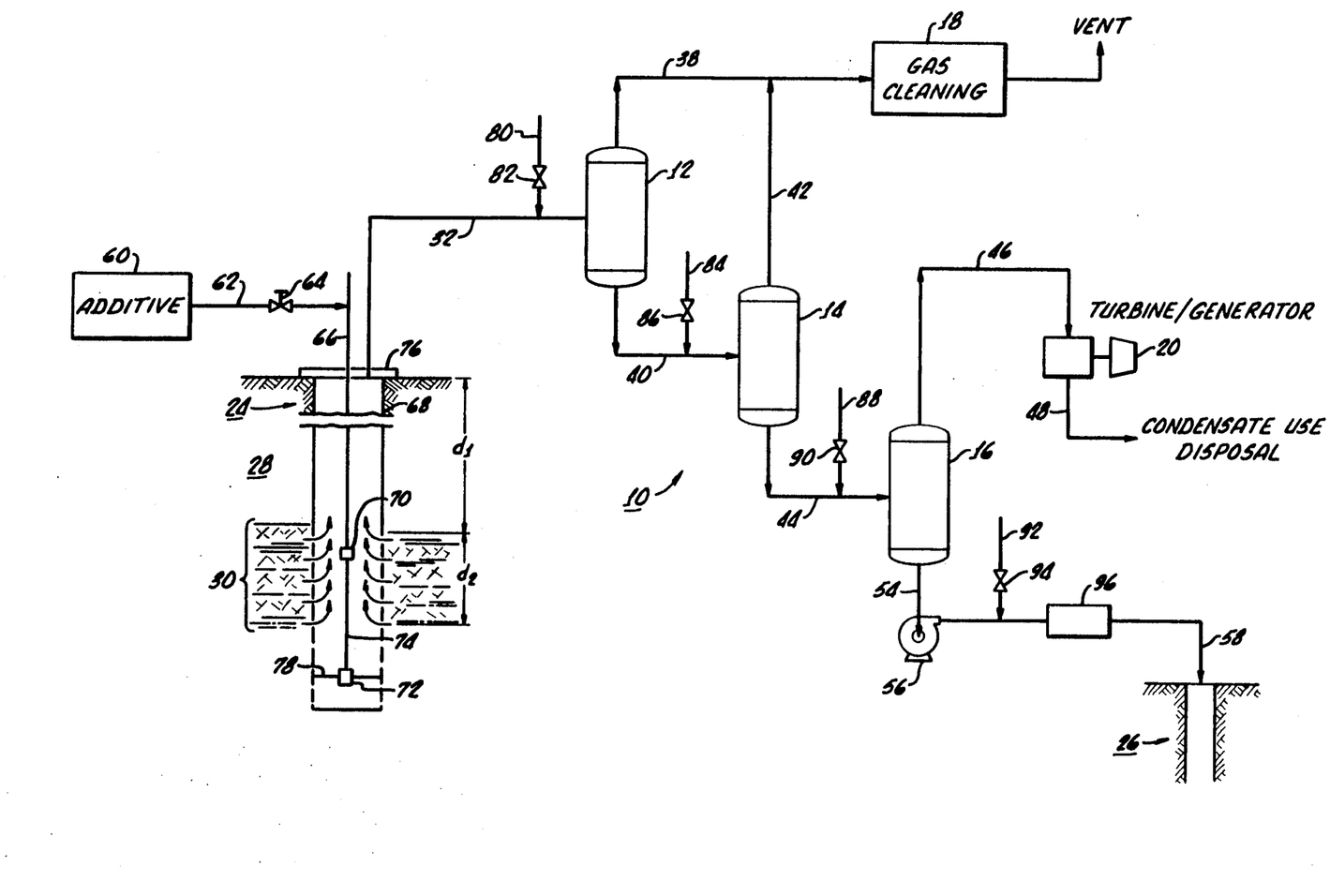

While the acid can be injected from source 60 downhole at producing formation 30 (as close as is practical to its orgin) so as to lower the pH of the brine, the pH of the brine usually increases further as it passes through power plant 10, for example, as noncondensible gases are removed at separators 12 and 14, and as the brine is flashed in vessel 16. Thus, it is preferred to inject further quantities of the acid into the brine flow to reduce scaling in places where significant pH increases otherwise occur. By so doing, a more uniform brine pH may be achieved. Alternatively, the amount of acid addition may be varied according to the amount required at various locations to maintain the pH at a level which will minimize scale formation.

While the acid treatment of this invention is effective in reducing the occurrence of a wide variety of scales, of particular importance are metal silicate scales, especially iron silicate scales. Such scales are believed to be formed first by the reaction of hydrated ferric oxyhydroxide with silicic acid or silicic acid oligomers, and then subsequent condensation, as follows:

Further acidizing the already acidic geothermal brine is believed to shift equilibrium conditions away from the formation of a precipitate and/or to interfere with the precipitation reaction involved. The hydrogen ions (H+) added to the brine by addition of further acid are believed to tie up the ferric oxyhydroxide and thereby inhibit the indicated reaction of ferric oxyhydroxide with silicic acid which forms insoluble iron-rich silicates. The optional addition of reducing agents capable of reducing trivalent iron and trivalent manganese cations is believed to further inhibit the formation of the precipitate by interfering with the formation of ferric and other heavy metal oxyhydroxides. However, regardless of the specific nature of the reaction involved and the specific effects upon the reaction of the acid and reducing agent, it has nevertheless been demonstrated that the method of this invention is effective in reducing the amount of iron-silica scales deposited from geothermal brine and preventing the plugging of injection wells, while inhibiting the corrosion of the metal vessels and conduits.

The application of the method of the present invention is illustrated in simplified form in the drawing which shows the relevant portions of an exemplary geothermal brine power plant 10. Generally power plant 10 comprises a first wellhead separator 12, second wellhead separator 14 and flash vessel 16. Shown included in power plant 10 are gas cleaning means 18 and steam turbine generator 20. Associated with power plant 10, but not actually forming a part thereof, are brine extraction well 28 and brine injection well 26. Extraction well 28 penetrates into earth 24 a depth "$d_1$" to brine producing formation 30 which has a thickness of "$d_2$." Ordinarily, injection well 26 is similar to extraction well 28, and may penetrate to the same producing formation 30.

In a preferred embodiment, the downhole apparatus employed in the method of this invention includes anchor 72 attached to nozzle 70 by connecting rod or conduit 74. Anchor 72 helps maintain the position of nozzle 70 in well 28 during the injection of the acid down conduit 66. Conduit 66 can be a small diameter coiled tubing extending several thousand feet down well 28 from wellhead 76, which in the absence of an anchor 72, would permit nozzle 70 to move about undesirably in well 28. Anchor 72 helps maintain nozzle 70 adjacent to brine producing formation 30, the location where it is desired to inject the mixture of acid and reducing agent into the flow of geothermal brine. For convenience, anchor 72 may be positioned anywhere in the vicinity of nozzle 70. Since the brine produced from formation 30 may precipitate scale in a lower portion of well 28, it is preferred to position anchor 72 in well 28 below producing formation 30 as shown in the drawing. Anchor 72 can be of any conventional design, for example, an anchor having three or more locking arms 78 which fold up independently as collars while anchor 72 is being lowered downhole. To set locking arms 78 against the formation when the desired depth is reached, conduit 66 is retracted a short distance so that the locking arms unfold. Later, when it is desired to remove nozzle 70 from the well, a stronger upward pull on conduit 66 shears a pin (not shown) in anchor 72, allowing locking arms 78 to collapse and the apparatus to be pulled out of well 28. Since the acid exits conduit 66 via nozzle 70, connecting rod or conduit 74 does not transport any fluid. The purpose of conduit 74 is merely to attach nozzle 70 firmly to anchor 72. Conduit is used in this embodiment to attach the anchor to the nozzle simply because conduit material is readily available and provides mechanical strength.

Since the portion of conduit 66 extending below wellhead 74 is exposed to the high temperature environment of the geothermal fluid being produced, it is preferred that conduit 66 and nozzle 70 be made of a corrosion resistant metal, e.g., stainless steel, Hastelloy, Inconel, or the like. In operation, hot geothermal brine is introduced under pressure from extraction well 28 through conduit 32 into the side region of first separator 12.

The brine typically contains large quantities of dissolved and/or suspended silica. Consequently, to avoid plugging the brine handling system, the power plant may also include one or more brine clarifiers (not shown) to remove the silica from the brine as it progresses through the plant. In addition, there may also be secondary sand-filters or other clarifiers which are used as the brine exits the plant to remove any residual suspended silica and scale prior to injecting the now cooled brine back into the field through well 36. Such systems are shown in Assignee's U.S. Pat. No. 4,728,438, dated Mar. 1, 1988, the teachings of which are incorporated in their entirety herein by reference.

Within separator 12, non-condensible gases, including hydrogen sulfide, carbon dioxide and ammonia, are stripped from the hot brine.

The effective pH of the brine as it enters well 28 from formation 30 is believed typically to be between about 4 and 4.5. However, due to removal of acidic non-condensible gases, the pH of the brine typically increases to between about 5 and 6 by the time it enters flashing vessel 16. Ordinarily, as the brine enters well 28 from formation 30, flashing occurs to an extent causing release of about 1 to 1.5 percent of the steam contained in the brine, and by the time the brine reaches the top of well 28, additional flashing usually has occurred to an extent that between about 10 and 20 percent of the steam has been released. Brine temperature at producing formation 30 varies considerably from well to well, but is usually in the broad range of from about 350° to 600° F., with a brine temperature of between about 450° to 500° F. being typical of many localities.

At pH values above about 5.3, the formation of an iron and/or manganese-rich silica scale seems to be accelerated. To retard or even prevent the formation of such scale, a small amount of the water soluble acid is injected into brine conduits 32 and 40 through acid conduits 80 and 84. The amount of acid added is typically enough to maintain the pH of the brine in the range of about 5.0 to about 5.3. The non-condensible gases are discharged from the top of separator 12 through gas conduit 38 into gas cleaning means 18 and the brine is discharged from the bottom of separator 12 through conduit 40 into the side region of second separator 14, in which any remaining amounts of non-condensible gases are stripped from the brine. These remaining gases are discharged from separator 14 through gas conduit 42 into conduit 38, to be directed thereby into gas cleaning means 18. Included in gas cleaning means 18 may be heat exchangers (not shown) which enable heat to be extracted from the hot non-condensible gases to create additional steam from steam condensate in a manner known to those skilled in the art.

From separator 14, the brine is discharged through conduit 44 into flashing vessel 16. Within flashing vessel 16, the brine is flashed to a substantially lower pressure, for example, from an initial pressure of about 450 p.s.i.g. to the lower pressure of about 50 p.s.i.g., so as to release steam which is routed from vessel 16 through conduit 46 to steam turbine-generator 20. Condensate and/or steam are discharged from turbine-generator 20 through conduit 48 for disposal or for routing to the heat exchangers of gas cleaning means 18. Flashed brine is discharged from flashing vessel 16 through conduit 54 to pump 56 which pumps the brine through conduit 58 into injection well 26. Alternatively, pump 56 may pump the brine to other means of disposal or to other uses (not shown).

In the present process, any convenient means of introducing the acid and, when it is used, the reducing agent to the brine can be used. However, when an acid and reducing agent are selected which evolve gases (e.g., hydrochloric acid and zinc metal, hydrochloric acid and potassium cyanide), care should be taken to avoid evolution of gases during the mixing of the acid and reducing agent, for example, by mixing the reducing agent upstream of the acid component or by mixing the reducing agent into a relatively dilute acidic solution. Usually, however, a mixture of acid and reducing agent is introduced from source 60, through conduit 62 containing valve 64 into conduit 66 which extends down well 28, inside of well casing 68, terminating in nozzle 70 positioned approximately opposite brine producing formation 30.

Thus, in addition to being injected downhole, acid either alone, or in combination with a reducing agent, is typically injected at the following locations: (1) into brine conduit 32 between wellhead 76 and first separator 12 via conduit 80 containing valve 82; (2) into brine conduit 40 between first and second separators 12 and 14 via conduit 84 containing valve 86; (3) into brine conduit 44 between second separator 14 and flash vessel 16 via conduit 88 containing valve 90; and (4) into conduit 58 just upstream of injection well 26 via conduit 92 containing valve 94; such injections tend to reduce, if not eliminate, the formation of iron and/or manganese-silicate scale.

The location at which precious metals-containing scale will deposit also depends upon the type of scale-reducing treatment used. In general, scale in geothermal systems forms when the brine is subjected to flashing or other scale-forming conditions wherein a supersaturated solution of dissolved solids forms in a liquid phase, followed by precipitation of scale. In the usual case, with unacidified brine, the constituents of the scale will deposit randomly in the brine handling equipment. Typically, after the brine has passed through all of the flashing and clarification stages in a geothermal power plant, the residual brine received in conduit 58 for deep-well injection has a temperature of about 220° F., a pH of about 5.2, a suspended solids concentration between about 10 and about 20 ppm and a total dissolved solids content of about 270,000 to about 300,000 ppm, including a silver concentration of about 0.2 to about 1 ppm. Concentrations of gold and platinum, when detected, are typically in the ppb range.

The controlled recovery of the silver (and other precious metals such as gold and platinum, when present) from clarified brine can be accomplished when the brine is first acidified to a pH of about 4.9 and then passed through an agitation spool 96 which is packed with one of more metals at least higher in the electromotive series than silver, and preferably higher than copper, said spool being placed in conduit 58. To accomplish the secondary objective of filtering the brine stream to remove suspended silica and scale particles therein, it is preferred that the packing have a relatively large surface are without unduly impeding fluid flow in the conduit. To this end small ($\frac{1}{8}$ to $\frac{1}{2}$ inch diameter) balls, flakes and coiled wire have all been found satisfactory, with coiled piano or "chicken" wire mesh being preferred. While at least some of the precious metals will also deposit out of a brine having a pH above about 5.0, it is found that acidifying the brine to have a controlled pH below about 5.0, just before it contacts the packing tends to enhance the reaction between the spool packing and the metal constituents of the brine. To this end, conduit 92 and valve 94 are provided for acid injection upstream of agitation spool 96. Of course if the brine in conduit 58 is already at a pH below 5.0 (an unusual occurrence) no acid need be injected at this time.

The higher electromotive series metals used for this purpose, in addition to having higher electromotive potentials than silver, are preferably essentially non-reactive when exposed to the acidified brine. Thus, metals such as magnesium and aluminum are normally found to be too reactive for this use. Metals which are suitable for purposes of this invention include steel and elemental metals such as zinc, iron, nickel, cobalt, cadmium, lead (and suitable alloys thereof), with steel, zinc and lead being preferred, steel and zinc being more preferred and zinc galvanized mild steel being most preferred.

The agitation spool 96 preferably comprises a packed conduit sufficiently long to provide a residence time adequate for a substantial proportion, preferably essentially all of the copper, silver and other precious metals therein to precipitate out. For a typical geothermal plant, this will be accomplished with a residence time of from about 2 to 10 minutes and generally a time of from about 2 to about 5 minutes. However, as the precious metal scales form on the packing and as other materials deposit, e.g., silica scale, iron and/or manganese scale and other particulates in the stream deposit thereon, the pressure drop across spool 96 will increase. Normally, the packing can be left in place until the pressure drop across the packing become excessive, i.e. until about a 50% or greater drop in pressure across the spool is observed. When the principal interest is to reduce the corrosivity of the brine, the residence time can be substantially reduced at the cost of reducing the amount of metal recovered.

The silver and other plated metals on the packing can be recovered by a variety of methods. For example, iron or steel wire can be easily dissolved in hydrochloric acid, leaving a silver-rich residue which can be refined by conventional smelting operations. Where ball bearings are used, they can be cleaned by milling, with the removed scale being collected for recovery, and the balls being recycled back into the process. In practice, it is recommended that a parallel system be employed so that, when one side is shut down for cleaning, the other side can be utilized without stopping the operation of the geothermal facility.

In use, it is also found that the packing will also remove at least some of any suspended particulate matter, e.g., silicon containing scale, which may still be in suspension in the brine at this time. The amount of particulate removal is typically in the range of from about 5 to 20 weight percent and more often in the range of 10 to 15 weight percent. In a pilot plant run in which the discharge from the spool packed with small steel balls was passed through a 15-20 micron cartridge filter, no problems were observed after 120 hours of operation whereas a similar filter in a line without a packed spool, as hereinabove described, became completely plugged with solids and scale deposition in just 23 hours. Such a striking difference cannot be explained solely on the basis of the amount of particulates removed. It is believed that the combination of acidifying the brine and then passing it through a packed agitation spool, as hereinabove described, polishes the brine by reducing the concentrations of iron and other heavy metals therein. As a result, the scale forming constituents of the brine are stabilized such that downstream scale precipitation is substantially reduced, for example, in the filter. Obviously, the deposition of heavy metal-rich scale and nodules in the outlet piping and injection well will also be substantially reduced, with the result that the useful life of the injection well will be extended by a factor of from 3 to 5. In addition, the treated brine is substantially less corrosive than would be expected in view of the acid addition. Indeed, the brine leaving the packed spool is actually less corrosive than it is upstream of the packed spool.

The following examples are set forth, solely for illustrative purposes, to further demonstrate the advantages obtainable by practice of the present invention. In all instances the brine utilized was obtained from a Salton Sea geothermal aquifer.

EXAMPLES 1 to 12

A pilot plant test apparatus was set up and operated with clarified brine taken at a rate of about 20 GPM from the overflow, at a temperature of about 220° F. and pressure of about 100 PSI, in a series of tests, each test lasting for up to about 120 hours. For tests 1 through 6, as described below, the clarified geothermal fluid comprised of about 90 percent by weight brine and about 10 percent by weight steam as produced from a production well at a temperature of 455° F. and a pressure of 400 p.s.i.g was used. The brine contained about 251,000 weight parts per million of various elements dissolved therein: less than 0.3 aluminum, 0.2 silver, 1.0 antimoney, 12.8 arsenic, 319 boron, 1,070 barium, 103 bromine, 1.2 cadmium, 25,000 calcium, 149,000 chlorine, 0.06 chromium, 12 cesium, 5.2 copper, 0.4 fluorine, 459 iron, 5 iodine, 13,500 potassium, 1,770 lithium, 49 magnesium, 793 manganese, 50,000 sodium, less than 0.1 nickel, 81 lead, 73 rubidium, less than 1 selenium, 200 silicon, 400 strontium, and 302 zinc.

The apparatus utilized in the tests includes a three inch conduit containing a portal for injecting the acid and along with a first corrosion/scale inspection spool and a static mixing spool. The static mixer is a 12 inch section of conduit housing a helix formed of stainless steel through which the fluid is forced as it moves along the three-inch conduit to provide the turbulence needed to thoroughly mix the acid into the brine. The pH of the brine is measured above and below the acid mixing spool. The brine next enters an agitation spool packed with a metal higher in the electromotive series than silver for a distance of about 24 inches. After passing through the packed spool, the brine was (in some tests) filtered through a cartridge filter and then exited the system through a second corrosion/scale inspection spool. The two corrosion/scaling spools are sections of conduit which hold conventional carbon steel corrosion strips to monitor the corrosiveness of brine upstream and downstream of the acid injection point. The second corrosion/scale spool was of a length sufficient to provide a total residence time of about 1 minute for the brine flowing through the test apparatus. At the exit from a simulated injection conduit the brine is normally at a temperature within the range of from about 50° F. to 400° F. and more typically at a temperature of from about 200° F. to 350° F. In tests with acidified brine, sufficient concentrated hydrochloric acid is added to achieve and maintain a concentration of about 20 ppm, which was sufficient to lower the pH to about 4.9.

Scale buildup on the piping can be measured by gamma radiographic techniques employing an Iridium 92 source; the source and film plate being positioned on opposite sides of the area of interest. The differences in gamma absorption of the brine, scale and steel results in sufficient contrast to produce a radiograph from which projected thickness of scale can be measured. At the conclusion of each of tests 1 through 11, the packings were removed and inspected, with the results observed being discussed below and summarized in Table I.

Test 1. This was a baseline test in which the center spool was left empty and the total brine flow was 1.44 MMlb. Average suspended solids in the brine was 30 ppm upstream and 33 ppm downstream of the center spool. Scales deposited in the three spools consisted primarily of copper and iron with the center spool scale having a silver concentration of about 84 oz/ton.

Test 2. The center spool which was packed with steel wool pads became completely plugged after about 2 hours of operation. Solids removed from the compacted pads were rich in copper and iron.

Test 3. Test 1 was repeated with the center spool being filled with ⅜ inch diameter carbon steel ball bearings of a size sufficient to increase the available scale deposition area by about a factor of 6 as compared to the unpacked spool and the run continued for 120 hours. At the conclusion of this time, the suspended solids had slightly increased from about 45 ppm upstream to about 52 ppm downstream. The brine analyses showed that the concentrations of silver, antimony and copper were all reduced in the center spool. The deposited scale on the balls was rich in copper, iron and arsenic. The scale deposited on the balls had silver, gold and platinum concentrations of about 408, 0.0.41 and 0.0035 oz/ton respectively. As seen in test 5 below, the silver recovered in this test was only about 46 percent of that recovered when the brine was acidified according to the present invention.

Test 4. Test 1 was repeated with the center spool being repacked with mossy zinc chips. The center spool completely plugged after about 4 hours of operation. Scale recovered from the zinc chips was primarily comprised of arsenic, copper and lead.

Test 5. Test 1 was repeated with the center spool being packed with a mixture of steel balls and mossy zinc chips and with the brine being acidified with hydrochloric acid. The center spool scaling rate was slightly higher than that observed in Test 1 while the downstream scaling rate was considerably lower. The upstream suspended solids concentration was about 76 ppm while that down stream was only about 41 ppm, i.e., there was a substantial decrease. The silver, old and platinum concentrations in the scale were 892, 0.0.008 and 0.0023 oz/ton respectively.

Test 6. Test 1 was repeated with the center spool being repacked with coiled steel chicken wire mesh galvanized with a layer of zinc on the surface thereof. While the rate of upstream scaling was basically similar to that in Test 1, the down stream rate was considerably lower. The wire collected approximately 2000 ppb of material with the average suspended solids being 52 ppb upstream and 78 ppb downstream, i.e., the suspended particle concentration increased. This may be due to small flakes of zinc and iron corrosion products spalling off during the test. The amount of silver, gold and platinum in the scale was 646, 0.008 and 0.0023 oz/ton respectively. Chicken wire mesh is cheap and, therefore, expendable. It can be sold directly to a metal reclaimer without any supplemental leaching or other chemical or mechanical cleaning operation being required.

Test 7. Test 6 was repeated with the brine being acidified with hydrochloric acid and with a cartridge filter being inserted between the packed spool and the downstream unpacked spool. This test ran for the full 120 hours as compared to just 23 hours in a comparison test using just the filter alone. The concentration of silver, gold and platinum in the scale was 350, 0.004 and 0.014 oz/ton respectively. Although these results are lower than those observed with unacidified brine, an analysis of the clarified brine provided showed that the concentrations of precious metals therein were noticeably lower than was the case with tests 1–6. Particulate concentrations were also very low (20 ppm) and the downstream scaling was somewhat greater than that observed upstream. This difference was a result of a change in the source of brine (the brine was obtained from a different well). The remaining tests 8 to 12 also utilized this same brine source. The deposit in the filter was mainly barite, silica and fluorite.

Test 8. Test 1 was repeated with the packing being lead wire. Scale deposition upstream of the lead wire was about the same as that observed downstream. The scale on the lead wire showed concentrations of 359, 0.002 and 0.016 oz/ton for silver, gold and platinum, respectively.

Test 9. Test 8 was repeated with the brine being acidified with hydrochloric acid. The silver recovery was only slightly lower than in test 8 and the remainder of the test results were essentially identical.

Test 10. Test 1 was repeated with the center spool being packed with copper wire. While the test run lasted the full 120 hours, the recovery of silver, gold and platinum was lower than that observed with the lead wire. From this, it appears that the less noble the packing metal, the better the recovery of precious metals in the brine. Scaling in both the upstream and downstream spools was essentially the same but the concentration of suspended material was slightly higher downstream. As reported in test 11 below, the amount of silver recovered was about 75 percent less than was recovered when the brine was acidified according to the present invention.

Test 11. Test 10 was repeated with the brine being acidified with hydrochloric acid. The amount of silver recovered was considerably higher than in Test 10, but were still below the amounts recovered in either of the lead wire tests. As in Test 10 upstream and downstream scaling rates were about the same but the downstream concentration of suspended material was considerably higher than that observed upstream from the packing. Since the scale can be removed from the wire merely by twisting it, it appears that, with acidified brine, the scale does not adhere tightly to the packing wire, and the normal vibration of the system may be enough to knock some of it off during the displacement operation.

Test 12. To determine the effect of the present invention on the corrosivity of the treated brine, a test substantially as described in Test 7 and using the same brine source as in Test 7 was conducted utilizing two sets of corrosion coupons. Each set comprised ten 2"×4" coupons having circular weld beads thereon. The coupons were formed from a variety of different metal compositions. One set was placed upstream of the acid injection point and the other set placed downstream of the packed spool. During the test about 20 ppm of hydrochloric acid was injected upstream of the packed spool to reduce the pH of the brine from about 5.5 to about 5.0. The test duration was 33 days. At the conclusion of the test the coupons were examined, and an estimate of general corrosion rates was made based on weight loss measurements. For the pitting weight loss, the depth of the deepest pit was measured, and the weight loss was calculated on the basis of what it would have been had metal been uniformly removed from the coupon to that measured depth. The results of this test are set forth in Table II.

The results set forth in Table II should not be used to estimate long term corrosion rates or resistance to corrosion cracking, in view of the relatively short exposure time. Nonetheless, they do clearly show that the brine is less corrosive after treatment than it is before treatment, in spite of the addition of acid and the corresponding reduction of pH of the brine.

As noted in the above test description, the difference in the test results observed for tests 6 and 7 appears to be explainable by an unanticipated change in the brine source in the operating plant. At the beginning of these tests, the brine had a nominal pH of about 5.2 and a silver concentration of between about 2.2 and about 2.4 oz/MMlb of brine (0.14-0.20 ppmw). However, prior to the start of test 7 and continuing through test 12, the brine source was changed and the copper and precious metals content of the clarified brine were observed to be from 20 to almost 50 percent lower than before. It is also noted that the levels of suspended scale observed in these tests is on the order of about 50% lower as well. There is no explanation for this difference since the two brine sources are physically located near each other and were expected to be substantially identical in composition. Consequently, the difference in test results observed when unacidified and acidified brines were used, particularly with ball bearings (tests 3 and 5), wherein the amount of precious metals recovered was doubled when the brine was acidified as described hereinabove and copper wire (tests 10 and 11), wherein it was tripled, should be considered as showing more clearly the efficacy of acidifying the brine prior to passing it into the agitation spool.

Referring to Table II it is seen that all of the coupons showed some decrease in corrosion rate in the treated brine as compared to the original brine prior to acidification. The 1018 mild steel did not show a substantial improvement. This is noteworthy, however, for one would have expected to see a dramatic increase in the corrosion rate in a more acidic environment. Some of the chromium alloy coupons which had low corrosion rates initially did not show a substantial improvement in the treated brine, within the limits of the measurement techniques utilized.

Nonetheless, all of the chromium alloy coupons showed a reduction in corrosion rates of at least about 30% and an average reduction in the corrosion rates in excess of about 50% in the treated brine as compared to the feed brine. Further, certain of the chromium alloy coupons which had significant corrosion rates in the feed brine showed an even higher reduction in corrosion rates in the treated brine in spite of the increase in acidity. The AL 29-24-2 ferritic, Type 316L and 2205 Duplex stainless steels not only showed a reduction in corrosion rates in excess of 30% and 50%, but a truly significant reduction in excess of 90% in the acidified treated brine as compared to the feed brine. Type 316L SS would not normally be considered for use in brine applications; however, it is a standard for corrosion against which other materials are judged.

In a commercial scale demonstration test of the method of the present invention, recovery in excess of 50 wt. % of the silver contained in the brine was readily obtained. The percent recovery of Pt and Au is generally substantially less than that of silver; however, they are present in the brine in such significantly lower quantities that the lower recovery rate does not have an appreciable adverse effect on the economic benefits obtained by the practice of the invention. While the value of the metals recovered is substantial, the real economic benefit is in the prolonged life of the injection wells. More particularly, at the end of about 32 days the pipe upstream of the brine treatment zone had accumulated a substantial thickness of scale, while the downstream pipe had only a thin film of scale. It was determined that the scale forming potential of the brine was reduced by at least 85% and it is anticipated that by further optimization of operating parameters a reduction of in excess of 90% is obtainable. The savings realized through the extended well life is usually in excess of at least seven times the value of the metals recovered.

While particular embodiments of the invention have been described, it will be understood that the invention is not limited thereto since many obvious modifications can be made. It is intended to include within this invention any such modifications as will fall within the scope of the appended claims.

TABLE I

COMPARISON OF TEST RESULTS USING A PACKED AGITATION SPOOL WITH ACIDIFIED AND UNACIDIFIED CLARIFIED GEOTHERMAL BRINES

| Example Number | Metal Packing | Suspended Solids Upstream | Downstream, ppm | Precious Metals Ag | Au | Pt | Recovery (oz/ton) |
|---|---|---|---|---|---|---|---|
| 1 | none | 30 | 33 | 84 | | | |
| 3 | Mild steel ball bearings No acid | 45 | 52 | 408 | 0.041 | | 0.0035 |
| 5 | Ball bearings with Zn chips and acid | 76 | 41 | 892 | 0.008 | | 0.0023 |
| 6 | Iron Chicken wire - no acid | 52 | 78 | 646 | 0.008 | | 0.0018 |
| 7* | Iron Chicken wire and acid | 26 | 20 | 350 | 0.004 | | 0.014 |
| 8* | Lead Wire No acid | 29 | 26 | 359 | 0.002 | | 0.016 |
| 9* | Lead Wire | 34 | 29 | 350 | 0.003 | | 0.017 |

TABLE I-continued

COMPARISON OF TEST RESULTS
USING A PACKED AGITATION SPOOL WITH
ACIDIFIED AND UNACIDIFIED CLARIFIED GEOTHERMAL BRINES

| Example Number | Metal Packing | Suspended Solids Upstream | Suspended Solids Downstream, ppm | Precious Metals Ag | Precious Metals Au | Precious Metals Pt | Recovery (oz/ton) |
|---|---|---|---|---|---|---|---|
| 10* | and acid Copper Wire | 21 | 28 | 83 | | 0.002 | >0.001 |
| 11* | No acid Copper Wire and acid | 22 | 37 | 318 | | 0.001 | 0.019 |

*Different brine source. See explanation in text

TABLE II

MEASURED CORROSION RATES

| Alloy | Upstream of Acid Weight Loss/Pitting | Downstream of Spool Weight Loss/Pitting |
|---|---|---|
| | (All Corrosion Rates in MPY) | |
| AISI 1018 mild steel | 277/480 | 250/900* |
| AL 29-4-2 ferritic SS[1] | 18.7/84 | 0.3/6 |
| Type 316L SS | 12.1/24 | 0.1/12 |
| 2205 duplex SS | 11.7/48 | 0.6/24 |
| SAF 2507 duplex SS[2] | 1.9/36 | 0.3/<6 |
| SM 2550 - 110 ksi yield | 1.4/0 | 0.4/0 |
| SM 2035 - 110 ksi yield | 0.8/0 | 0.4/0 |
| 904L SS | 0.6/6 | 0.4/0 |
| Carpenter 20Cb-3 SS | 0.4/12 | 0.1/6 |
| Inconel 625 | 0.3/0 | 0.2/0 |

*This high value results from a single deep crevice in the coupon. The cause of the crevice is not known.
[1]29% Cr, 4% Mo, 2% Ni.
[2]New duplex stainless steel from Sandvik; 25% Cr, 7% Ni, 4% Mo, 0.3% N

What is claimed is:

1. A method for extending the useful life of a brine injection well comprising treating a brine to reduce its scale forming potential, said brine containing suspended solids and dissolved scale forming constituents at least some of which comprise silicon-containing components, by passing the brine containing scale forming constituents at a pH below about 5.0 through a conduit packed with at least one metal higher in the electromotive series than copper for a time sufficient to stabilize the scale forming constituents in the brine, discharging the brine of potentially reduced scale forming potential and injecting the brine into the injection well.

2. The method of claim 1 wherein the pH of the brine is below about 5.0 due to the addition to the brine of an acid component selected from the group consisting of brine soluble acids or acid precursors.

3. The method of claim 2 wherein said acid component is an inorganic mineral acid selected from the group consisting of hydrochloric, sulfuric, nitric and perchloric acids or an organic carboxylic acid selected from the group consisting of substituted and unsubstituted aromatic and aliphatic monocarboxylic, dicarboxylic and tricarboxylic acids having from 1 to about 6 carbon atoms.

4. The method of claim 2 wherein said acid component comprises hydrochloric acid.

5. The method of claim 1 wherein said metal higher in the electromotive series than copper is selected from the group consisting of steel, zinc, iron, nickel, cobalt, cadmium, lead, and alloys thereof.

6. The method of claim 5 wherein the metal packing is selected from the group consisting of coiled piano wire, coiled chicken wire mesh, small balls and flakes.

7. The method of claim 4 wherein the metal packing is steel chicken wire mesh galvanized with a layer of zinc on the surface thereof.

8. The method of claim 1 wherein said brine is clarified to remove excess silica therefrom before being passed through said packed conduit.

9. The method of claim 1 wherein the sufficient time is from about 2 to 5 minutes.

10. The method of claim 2 wherein the pH of said brine is about 4.9 just before it enters the packed conduit.

11. The method of claim 7 wherein said brine is obtained from a Salton Sea geothermal acquifer.

12. The method of claim 10 wherein said silicon-containing component comprises silica.

13. The method of claim 12 wherein said silicon-containing component comprises silica and trivalent iron.

14. The method of claim 10 wherein said silicon containing component comprises silica, trivalent iron and trivalent manganese.

15. A method for treating a corrosive feed brine containing at least one recoverable metal selected from the group consisting of copper and metals below copper in the electromotive series to reduce its corrosivity, said method comprising reducing the pH of the brine below about 5.0 and passing it through a conduit packed with at least one metal higher in the electromotive series than copper for a time sufficient to precipitate a substantial portion of the recoverable metal in the packed conduit, and discharging from the conduit a brine less corrosive than the feed brine and having a pH less than that of the feed brine.

16. The method of claim 15 wherein the pH of the feed brine is reduced to below about 5.0 by the group consisting of brine soluble acids or acid precursors.

17. The method of claim 16 wherein said acid component is an inorganic mineral acid selected from the group consisting of hydrochloric, sulfuric, nitric and perchloric acids or an organic carboxylic acid selected from the group consisting of substituted and unsubstituted aromatic and aliphatic monocarboxylic, dicarboxylic and tricarboxylic acids having from 1 to about 6 carbon atoms.

18. The method of claim 16 wherein said acid comprises hydrochloric acid.

19. The method of claim 16 wherein said recoverable metal comprises at least one metal selected from the group consisting of copper, silver, gold and platinum.

20. The method of claim 18 wherein said recoverable metal comprises silver.

21. The method of claim 17 wherein said recoverable metal comprises copper and silver.

22. The method of claim 19 wherein said metal higher in the electromotive series than copper is selected from the group consisting of steel, zinc, iron, nickel, cobalt, cadmium, lead, and alloys thereof.

23. The method of claim 22 wherein the packing is selected from the group consisting of coiled piano wire, coiled chicken wire mesh, small balls and flakes.

24. The method of claim 23 wherein the packing is steel chicken wire mesh galvanized with a layer of zinc on the surface thereof.

25. The method of claim 22 wherein said brine is a geothermal brine.

26. The method of claim 25 wherein said brine is injected into a deep well after it leaves said conduit.

27. A method for treating a corrosive feed brine containing scale forming constituents, at least some of which comprise silicon-containing components, to reduce its corrosivity and scale forming potential, said method comprising reducing the pH of the feed brine to below about 5.0, passing it through a conduit packed with at least one metal higher in the electromotive series than copper for a time sufficient to reduce the corrosivity of the brine and stabilize the scale forming constituents contained therein, and discharging from said conduit a brine substantially less corrosive than the feed brine and having a substantially reduced scale forming potential.

28. The method of claim 27 wherein the pH of the feed brine is reduced below about 5.0 due to the addition to the brine of an acid component selected from the group consisting of brine soluble acids or acid precursors.

29. The method of claim 1 wherein said acid component is an inorganic mineral acid selected from the group consisting of hydrochloric, sulfuric, nitric and perchloric acids or an organic carboxylic acid selected from the group consisting of substituted and unsubstituted aromatic and aliphatic monocarboxylic, dicarboxylic and tricarboxylic acids having from 1 to about 6 carbon atoms.

30. The method of claim 28 wherein said acid component is hydrochloric acid.

31. The method of claim 27 wherein said metal higher in the electromotive series than copper is selected from the group consisting of steel, zinc, iron, nickel, cobalt, cadmium, lead, and alloys thereof.

32. The method of claim 31 wherein the packing is selected from the group consisting of coiled piano wire, coiled chicken wire mesh, small balls and flakes.

33. The method of claim 27 wherein the packing is steel chicken wire mesh galvanized with a layer of zinc on the surface thereof.

34. The method of claim 27 wherein said brine is clarified to remove excess silicon-containing components therefrom before being passed through the packed conduit.

35. The method of claim 27 wherein the pH of said brine is about 4.9 just before it enters the packed conduit.

36. The method of claim 27 wherein said brine is a geothermal brine.

37. The method of claim 36 wherein said brine is injected into a deep well after it leaves the packed conduit.

38. A method of prolonging the useful life of a geothermal brine re-injection well comprising treating a geothermal feed brine, containing suspended and dissolved scale forming constituents at least some of which comprise silicon-containing components and some of which comprise at least one recoverable metal selected from the group consisting of copper and metals below copper in the electromotive series, by passing the feed brine at a pH below about 5.0 through a conduit packed with at least one metal higher in the electromotive series than copper for a time sufficient for a substantial portion of the recoverable metal to precipitate onto the packing in said conduit, and to stabilize the scale forming constituents of the brine; and discharging from said conduit a treated brine containing a substantial percentage of the initial suspended solids and having a substantially lower scale forming potential, and introducing said treated brine into a reinjection well.

39. The method of claim 38 wherein the pH of the feed brine is below about 5.0 due to the addition to the brine of an acid component selected from the group consisting of brine soluble acids or acid precursors.

40. The method of claim 39 wherein said acid component is an inorganic mineral acid selected from the group consisting of hydrochloric, sulfuric, nitric and perchloric acids or an organic carboxylic acid selected from the group consisting of substituted and unsubstituted aromatic and aliphatic monocarboxylic, dicarboxylic and tricarboxylic acids having from 1 to about 6 carbon atoms.

41. The method of claim 39 wherein said acid comprises hydrochloric acid.

42. The method of claim 38 wherein said recoverable metal comprises at least one metal selected from the group consisting of copper, silver, gold and platinum.

43. The method of claim 38 wherein said recoverable metal comprises silver.

44. The method of claim 39 wherein said recoverable metal comprises copper and silver.

45. The method of claim 38 wherein said conduit is packed with a metal selected from the group consisting of steel, zinc, iron, nickel, cobalt, cadmium, lead, and alloys thereof.

46. The method of claim 45 wherein the packing is selected from the group consisting of coiled piano wire, coiled chicken wire mesh, small balls and flakes.

47. The method of claim 45 wherein the packing is steel chicken wire mesh galvanized with a layer of zinc on the surface thereof.

48. The method of claim 47 wherein said brine is clarified to remove excess silicon-containing components therefrom before being passed through said packed conduit.

49. The method of claim 48 wherein said brine is obtained from a Salton Sea geothermal acquifer.

50. The method of claim 49 wherein from about 5 to 20 weight percent of the suspended particulates are removed.

51. The method of claim 49 wherein said silicon-containing component comprises silica.

52. The method of claim 51 wherein said silicon-containing component comprises silica, trivalent iron and trivalent manganese.

53. A method for extending the useful life of a geothermal brine re injection well and reducing the corrosivity of a geothermal feed brine containing suspended and dissolved scale forming constituents at least some of which comprise silicon-containing components and some of which comprise at least one recoverable metal selected from the group consisting of copper and metals below copper in the electromotive series said method comprising reducing the pH of the brine to below about 5.0, passing it through a conduit packed with at least one metal higher in the electromotive series than copper for a time sufficient for a substantial portion of the recoverable metal to precipitate onto the packing in said conduit, to reduce the corrosivity of the brine, and to stabilize the scale forming constituents of the brine; and discharging from said conduit a treated brine less corrosive than the feed brine and having a substantially reduce scale forming potential, and re injecting the treated brine into a re injection well.

54. The method of claim 53 wherein the pH of the feed brine is reduced below about 5.0 by the addition to the brine of an acid component selected from the group consisting of brine soluble acids or acid precursors.

55. The method of claim 54 wherein said acid component is an inorganic mineral acid selected from the group consisting of hydrochloric, sulfuric, nitric and perchloric acids or an organic carboxylic acid selected from the group consisting of substituted and unsubstituted aromatic and aliphatic monocarboxylic, dicarboxylic and tricarboxylic acids having from 1 to about 6 carbon atoms.

56. The method of claim 54 wherein said acid component is hydrochloric acid.

57. The method of claim 53 wherein said metal higher in the electromotive series than copper is selected from the group consisting of steel, zinc, iron, nickel, cobalt, cadmium, lead, and alloys thereof.

58. The method of claim 57 wherein the packing is selected from the group consisting of coiled piano wire, coiled chicken wire mesh, small balls and flakes.

59. The method of claim 57 wherein the packing is steel chicken wire mesh galvanized with a layer of zinc on the surface thereof.

60. The method of claim 53 wherein said brine is clarified to remove excess silicon-containing components therefrom before being passed through said packed conduit.

61. The method of claim 53 wherein the time said brine is in the packing in the conduit is from about 2 to about 5 minutes.

62. The method of claim 53 wherein the pH of said brine is reduced to about 4.9 just before it enters said packed conduit.

63. The method of claim 59 wherein said recoverable metal comprises at least one metal selected from the group consisting of copper, silver, gold and platinum.

64. The method of claim 53 wherein said recoverable metal comprises silver.

65. The method of claim 53 wherein said recoverable metal comprises copper and silver.

66. The method of claim 65 wherein said metal higher in the electromotive series than copper is selected from the group consisting of steel, zinc, iron, nickel, cobalt, cadmium, lead, and alloys thereof.

67. The method of claim 66 wherein the packing in the conduit is selected from the group consisting of coiled piano wire, coiled chicken wire mesh, small balls and flakes.

68. The method of claim 66 wherein the packing is steel chicken wire mesh galvanized with a layer of zinc on the surface thereof.

69. The method of claim 68 wherein said brine is clarified to remove excess silicon-containing components therefrom before being passed through said packed conduit.

70. The method of claim 68 wherein said brine is a Salton Sea geothermal brine.

71. The method of any one of claims 21, 26, 43 or 65 wherein the excess of about 50 weight percent of the silver contained in the feed brine is collected in the packed conduit.

72. The method of any one of claims 15 or 53 wherein the corrosivity based on weight loss, of the feed brine with respect to a corrosion coupon consisting of type 316L SS is reduced by at least 90% as compared to an untreated feed brine.

73. The method of any one of claims 21 or 44 wherein in excess of 50 weight percent of the silver contained in the feed brine is collected in the packed conduit.

74. The method of any one of claims 22, 31 or 66 wherein the corrosivity, based on weight loss, of the feed brine with respect to a corrosion coupon consisting of AL29-4-2 ferritic stainless steel is reduced by at least 90% as compared to an untreated feed brine.

75. The method of any one of claims 1, 38 or 53 wherein the scale forming potential of the brine is reduced by at least about 85% as compared to an untreated brine.

76. The method of any one of claims 5, 33, or 48 wherein the scale forming potential of the brine is reduced by at least about 85% as compared to an untreated brine.

77. A method for treating an aqueous geothermal fluid at an elevated temperature comprising introducing the geothermal fluid containing dissolved and/or suspended materials comprising precious metals and silicon components and having a pH below about 5 into a conduit packed with at least one metal higher in the electromotive series than copper for a time sufficient for some of said materials to deposit on said packing and discharging from said conduit a fluid containing trivalent metal cations.

78. The method of claim 77 wherein the fluid has a pH below about 5 as a result of the addition of an acid thereto.

79. The method of any one of claims 1, 15, 27, 38 or 53 wherein the treated brine contains trivalent metal cations.

80. A method for treating a geothermal brine comprising silicon-containing components, said method comprising passing the brine at an elevated temperature and at a pH below about 5.0 through a packing comprising at least one metal higher in the electromotive series than copper, and substantially immediately thereafter injecting the brine into a re-injection well leading to a subterranean formation.

81. The method of claim 80 wherein said geothermal brine prior to passage through the packing further contains at least one dissolved metal.

82. The method of claim 81 wherein said geothermal brine prior to passage through the packing further contains suspended solids.

83. The method of claim 81 wherein said at least one dissolved metal in said brine comprises iron.

84. The method of claim 81 wherein said at least one dissolved metal in said brine comprises manganese.

85. The method of claim 81 wherein the brine passed through packing had been at least in part previously passed through a clarification vessel to separate suspended silicon-containing components therefrom, with at least one residual silicon-containing components still remaining in the brine after passage through said clarification vessel.

86. The method of claim 85 wherein the silicon-containing components both in the brine entering said clarification vessel and said pacing comprise silica.

87. The method of claim 86 wherein the pH of below about 5.0 is achieved by acid addition to the brine.

88. The method of claim 87 wherein the brine is at a temperature of about 50° to 400° F. during passage through said packing.

89. The method of any one of claims 83, 86, or 88 wherein said dissolved metal comprises silver.

90. The method of claims 80, 85 or 88 wherein the packing comprises wire mesh.

91. The method of claim 82 wherein the brine still contains a substantial portion of the suspended solids after passing through said packing.

92. The method of any one of claims 41, 65 or 85 wherein the useful life of the re-injection well is increased by a factor of from 3 to 5.

* * * * *

UNITED STATES PATENT AND TRADEMARK OFFICE
CERTIFICATE OF CORRECTION

PATENT NO. : 5,145,515

DATED : September 8, 1992

INVENTOR(S) : Gallup et al.

It is certified that error appears in the above-identified patent and that said Letters Patent is hereby corrected as shown below:

Claim 1, column 15, line 46, after "brine of" delete "potentially", and after "potential" add -- , --.

Claim 16, column 16, line 48, after "5.0 by the" add -- addition to the brine of an acid component selected from the --.

Claim 29, column 17, line 31, change "1" to -- 28 --.

Claim 53, column 19, lines 6 and 7, change "reduce" to -- reduced --.

Claim 63, column 19, line 43, change "59" to -- 57 --.

Claim 74, column 20, line 13, delete "feed".

Signed and Sealed this

Nineteenth Day of April, 1994

Attest:

BRUCE LEHMAN

Attesting Officer    Commissioner of Patents and Trademarks